United States Patent Office 3,322,249
Patented May 30, 1967

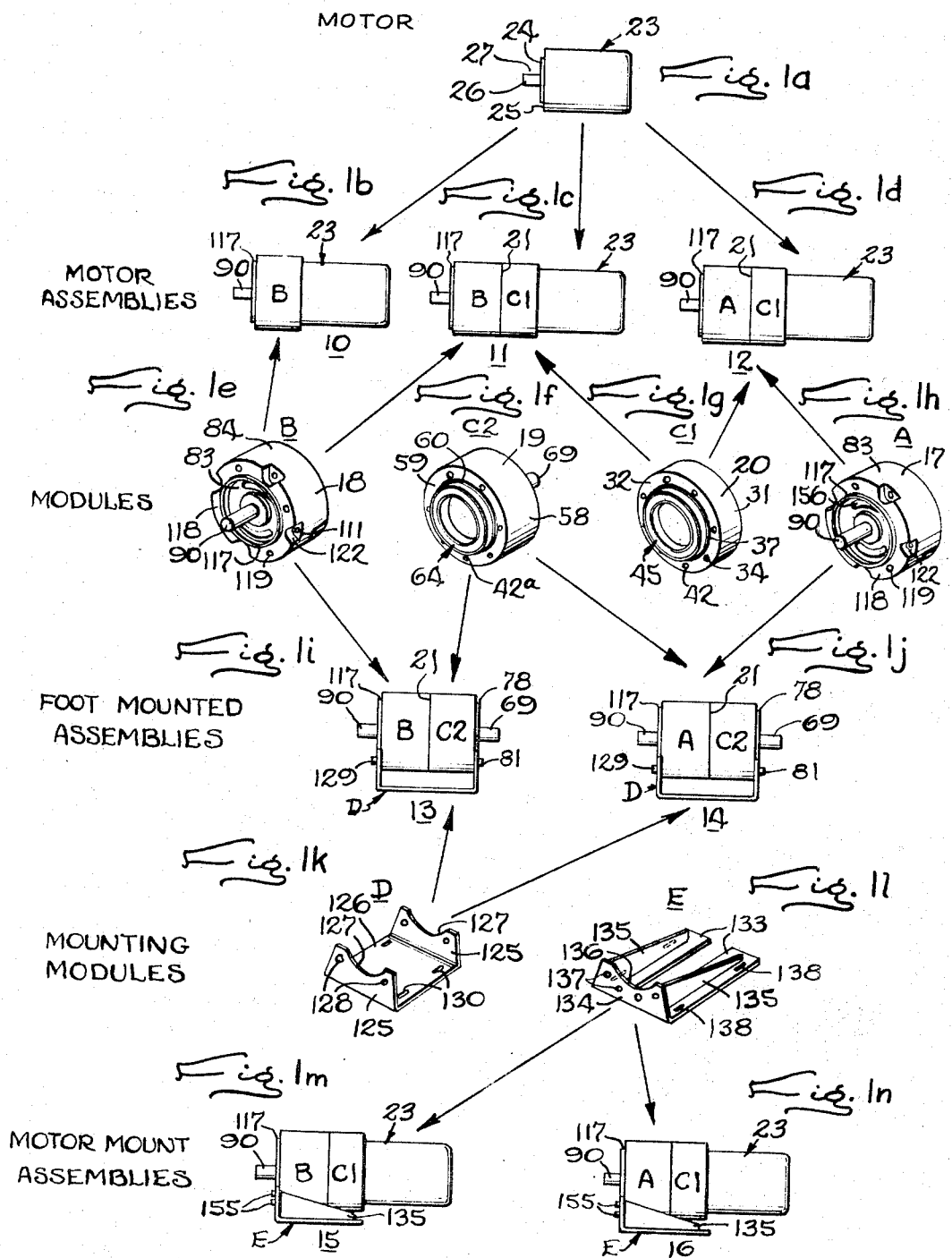

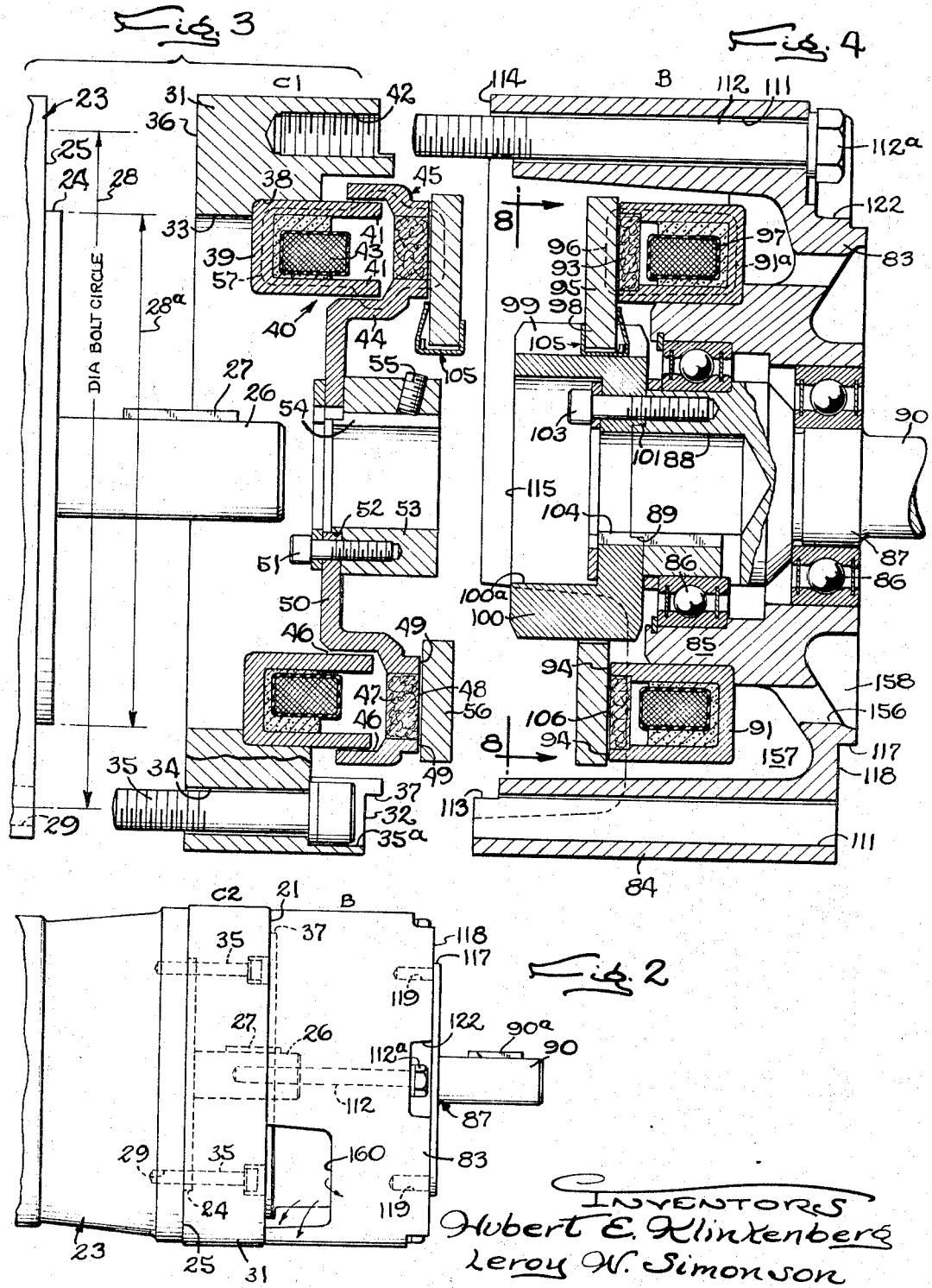

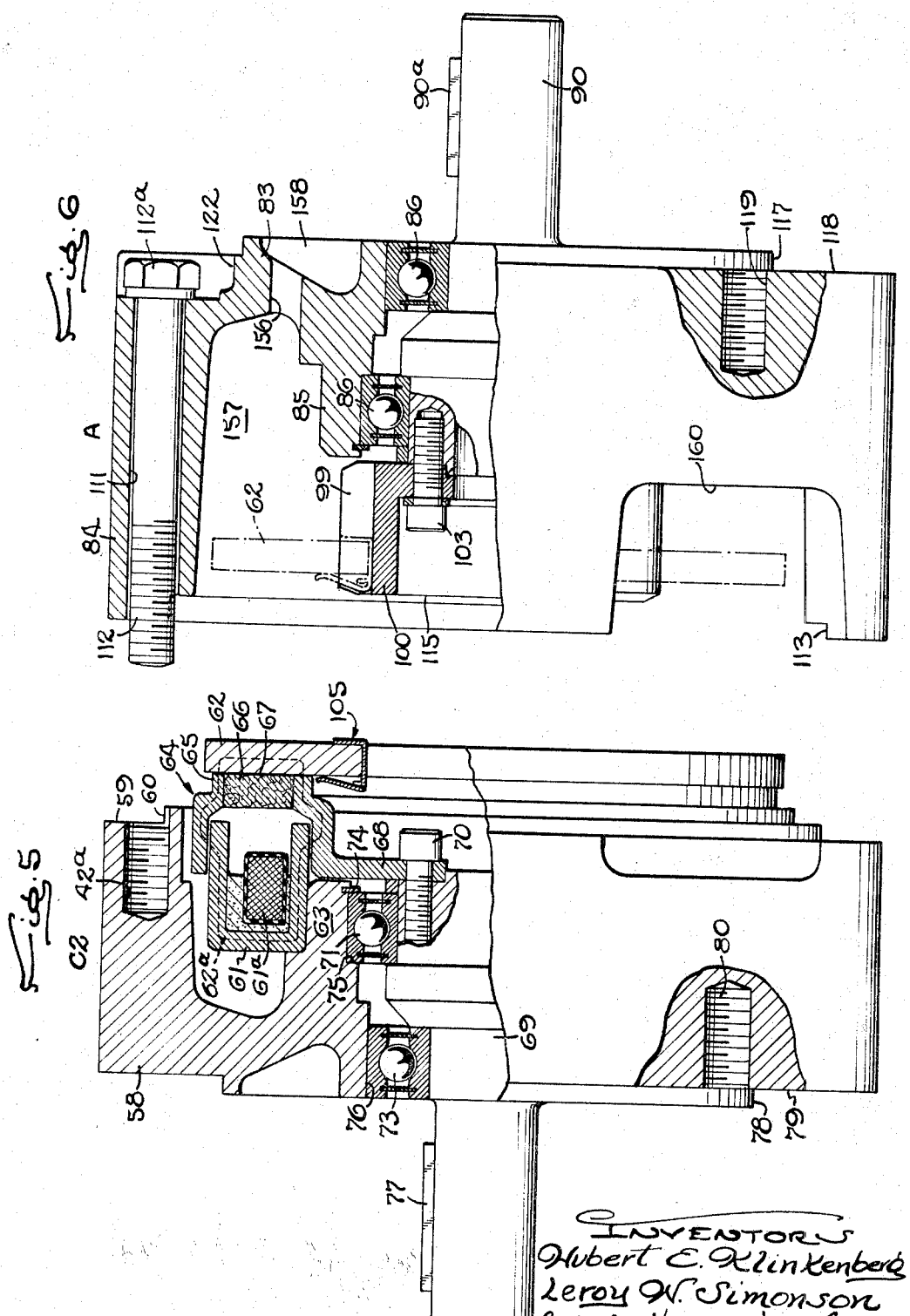

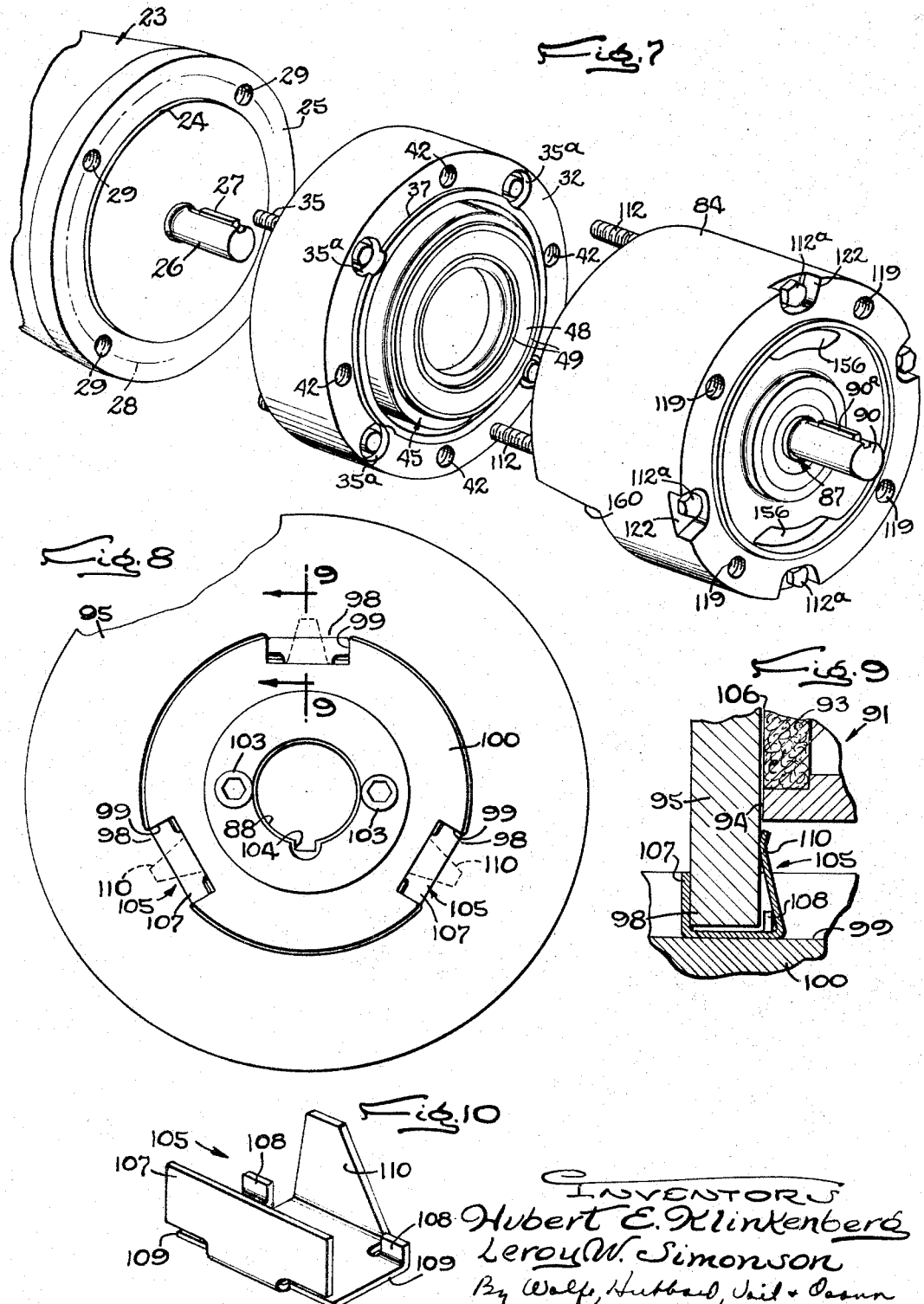

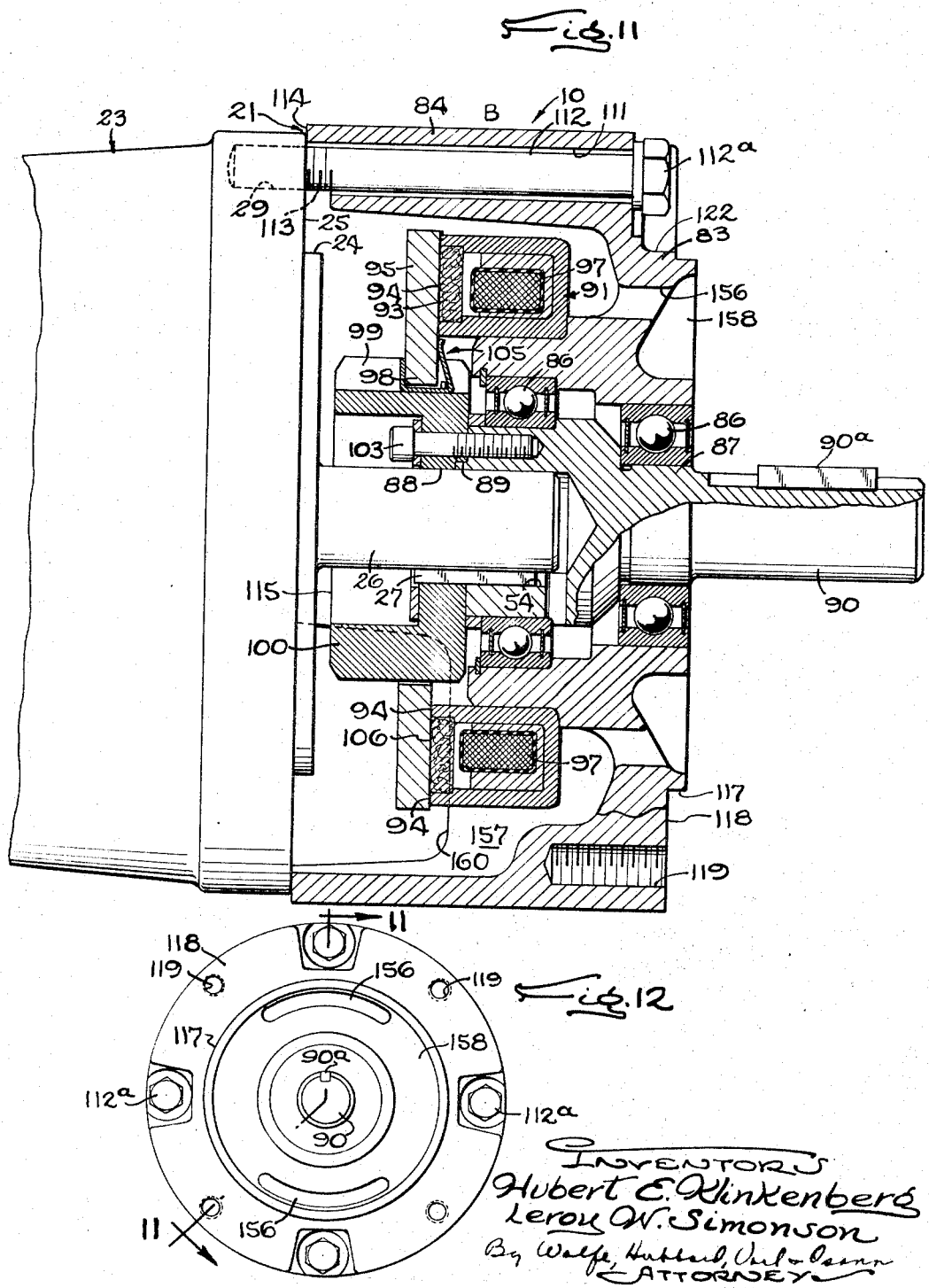

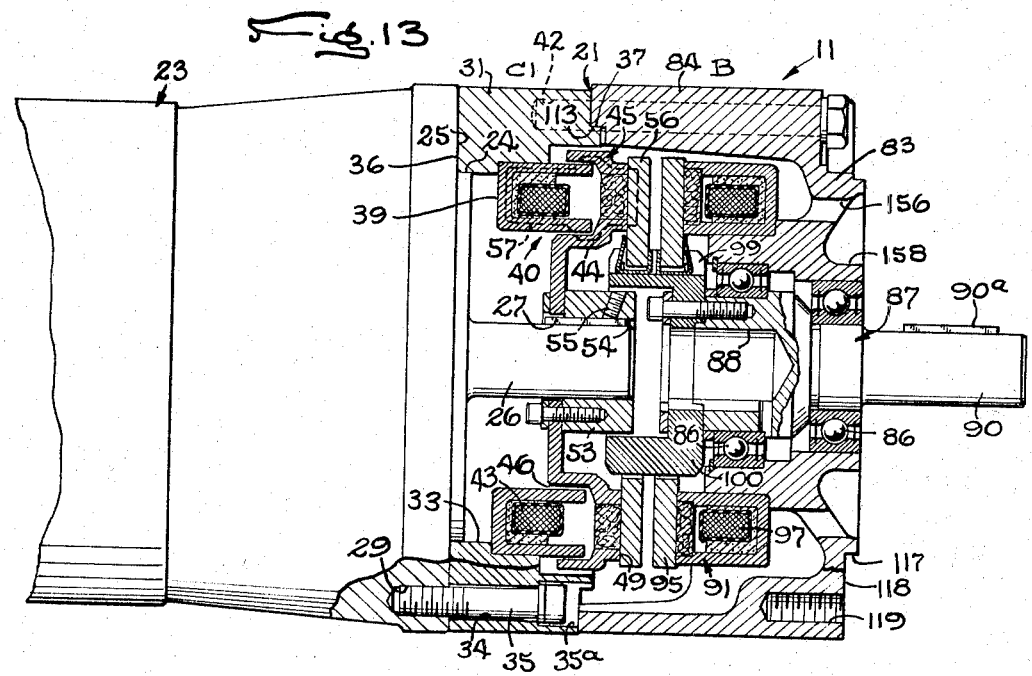

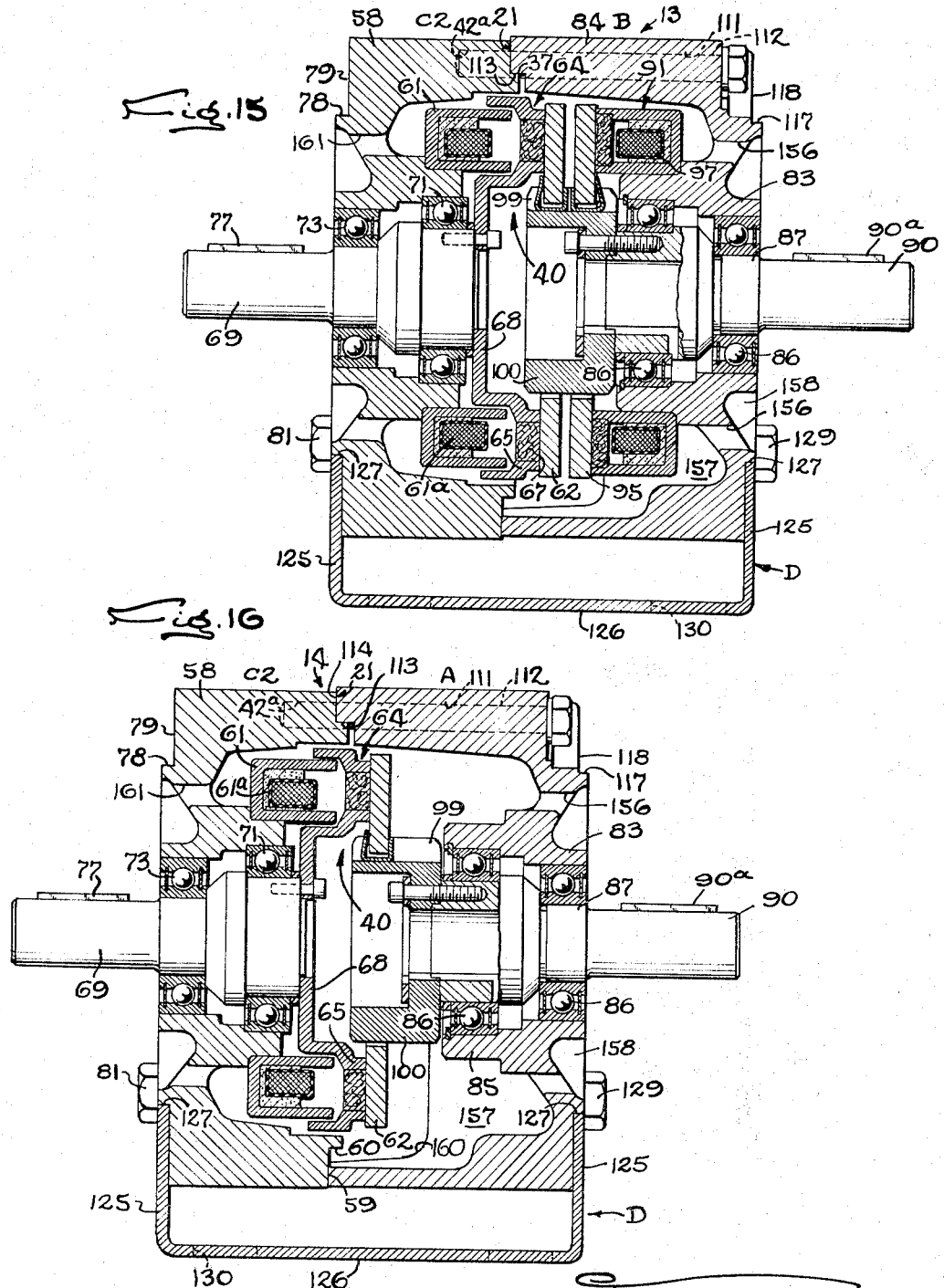

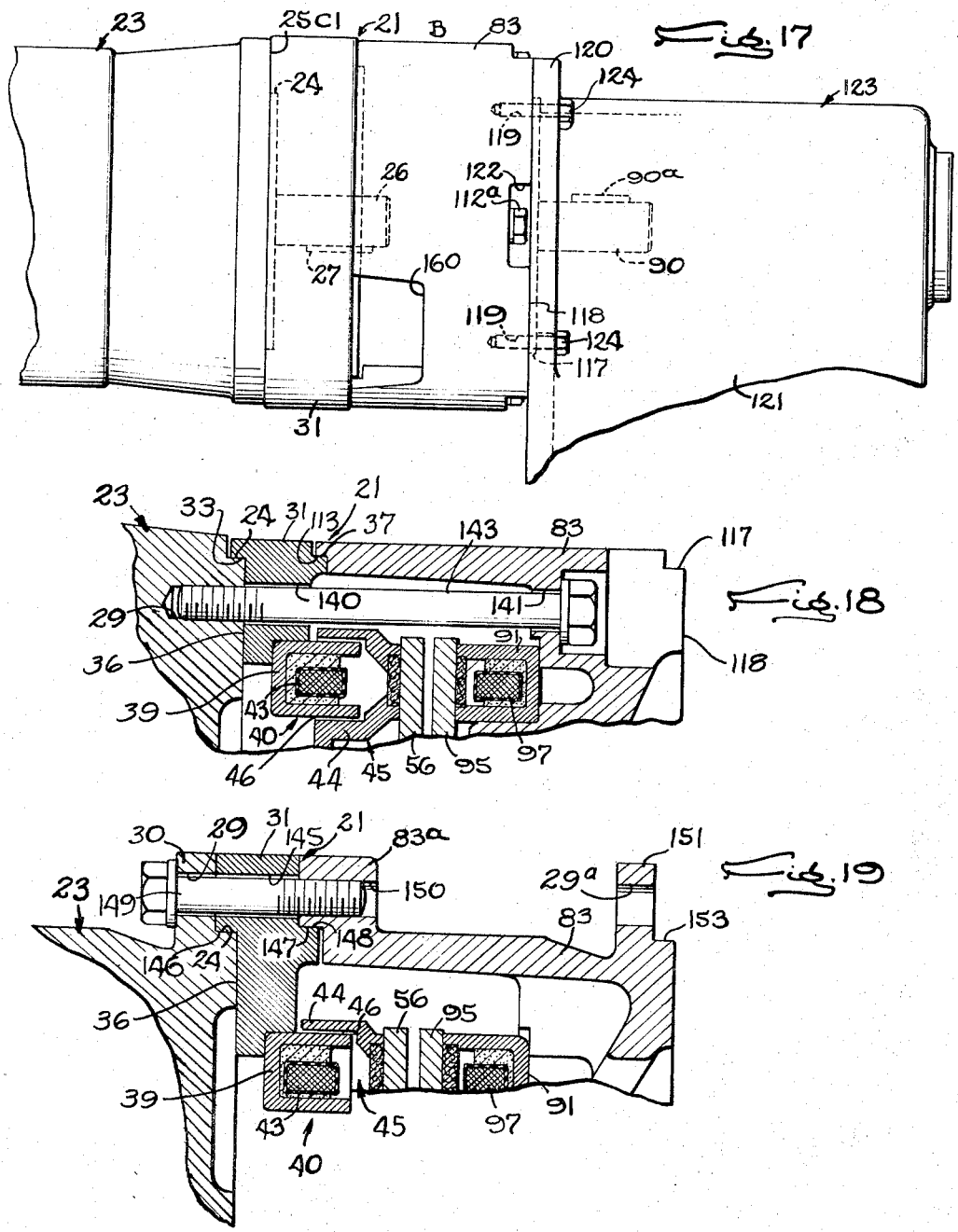

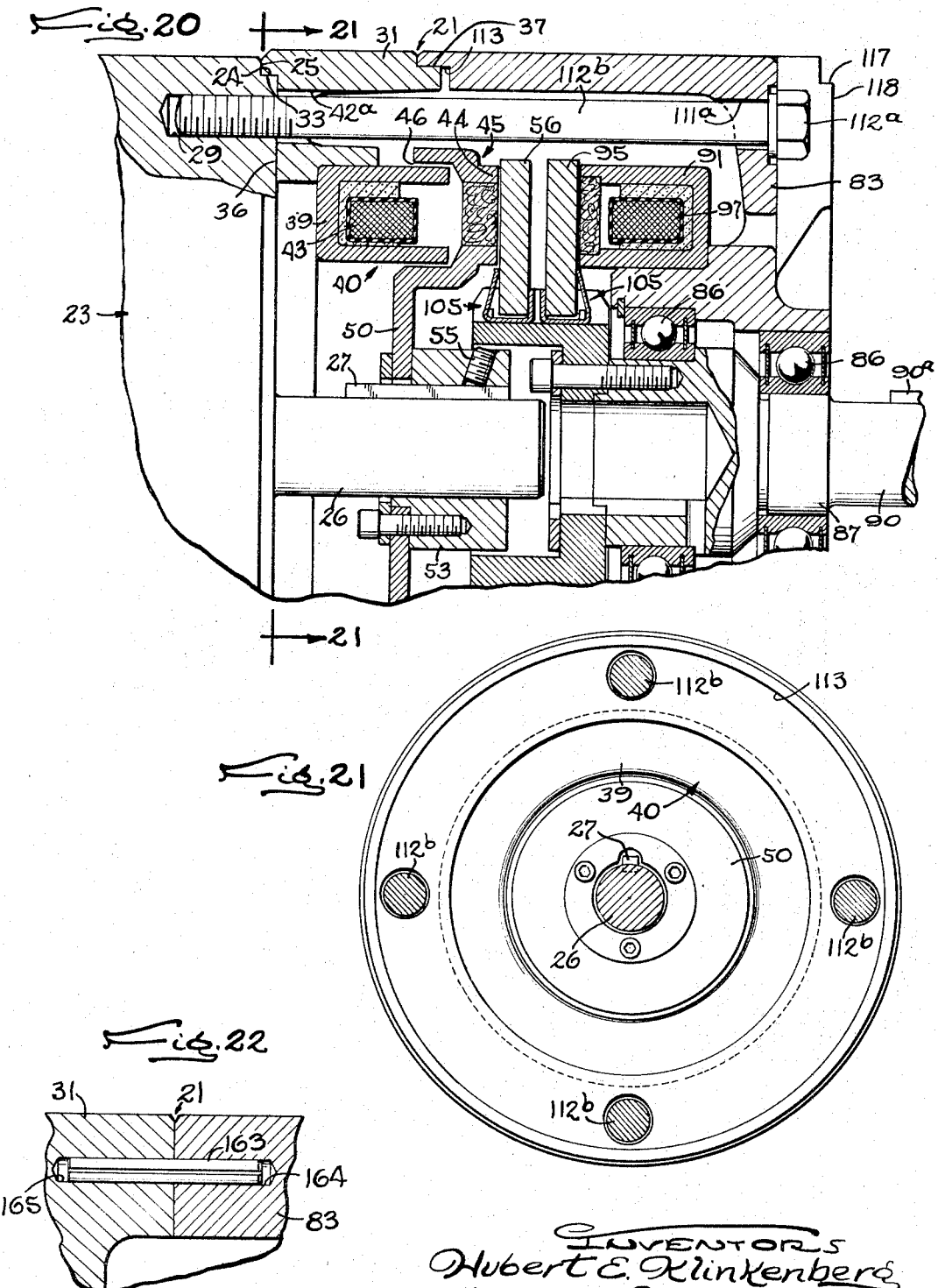

3,322,249
MAGNETIC FRICTION COUPLINGS
Hubert E. Klinkenberg and Leroy W. Simonson, Beloit, Wis., assignors to Warner Electric Brake & Clutch Company, South Beloit, Ill., a corporation of Delaware
Continuation of application Ser. No. 385,190, July 27, 1964. This application Oct. 18, 1966, Ser. No. 595,288
11 Claims. (Cl. 192—18)

This application is a continuation of our pending application Ser. No. 385,190, filed July 27, 1964, and now abandoned.

This invention relates to magnetic friction clutches and clutch-brake combinations of the type in which input and output shafts extend into opposite ends of a hollow casing comprising two parts which are bolted together after mounting of the magnet and friction elements therein. In certain aspects, the invention is concerned with such clutches in which one of the casing parts is adapted for mounting on the end face of an electric motor as standardized by the National Electrical Manufacturers Association (NEMA).

The primary object is to provide a friction coupling of the above character in which the construction of the two part casing is correlated in a novel manner with the construction and arrangement of magnetic and friction elements to enable a coupling to be adapted for standardized motor or base mountings and to perform either clutching or clutching and braking functions simply by selecting and assembling a pair of preformed input and output modules or units having the desired mounting and functional characteristics.

Another object is to achieve, in the assembly of the casing parts, precise alinement of the input and output shafts and precise location of the clutch parts by a novel construction of the casing parts.

A further object is to utilize the standardized contour of a motor end bell in a novel manner to locate accurately within the input ring of the casing the relatively rotatable pole pieces of a clutch of the stationary field type.

A further object is to duplicate a substantial number of parts in the different modules and thus lower the overall cost of the individual modular combinations.

The invention also resides in the novel construction and location of the joint between the module housings and the arrangement of the operating parts on the latter for quick and convenient assembly.

Other objects and advantages of the invention will become apparent from the following detailed description taken in connection with the accompanying drawings, in which FIGURE 1 is a composite view of the magnetic friction coupling modules contemplated by the present invention illustrating diagrammatically the manner in which these are combined to form various clutch and clutch-brake assemblies, FIG. 1a being an elevational view of a standard NEMA electric motor, FIGS. 1e–1h, FIG. 1k and FIG. 1l perspective views of the different modules, and FIGS. 1b, c, d, i, j, m and n elevational views of the module assemblies and their mountings.

FIG. 2 is a fragmentary elevational view of a clutch-brake motor mounted assembly.

FIG. 3 is a diametrical cross-sectional view of one clutch module illustrating the manner of its association with the end face of a motor.

FIG. 4 is a diametrical sectional view of the brake module.

FIGS. 5 and 6 are fragmentary diametrical sectional views of another clutch module and the output shaft module.

FIG. 7 is a fragmentary perspective view of a NEMA motor and clutch and brake modules to be mounted thereon.

FIG. 8 is a fragmentary sectional view taken along the line 8—8 of FIG. 4.

FIG. 9 is a fragmentary section taken along the line 9—9 of FIG. 8.

FIG. 10 is a perspective view of a gap maintaining device.

FIG. 11 is a diametrical view of the brake module mounted on a NEMA motor.

FIG. 12 is an end view of FIG. 11.

FIGS. 13 and 14 are diametrical sectional views of clutch-brake and clutch assemblies motor mounted.

FIGS. 15 and 16 are diametrical sections of clutch-brake and clutch assemblies foot mounted.

FIG. 17 is a fragmentary elevational view of motor clutch-brake and gear box assembly.

FIGS. 18 and 19 are fragmentary diametrical sections similar to FIG. 13 but showing other types of NEMA motor constructions.

FIG. 20 is a fragmentary view similar to FIG. 13 with the module casings attached to the motor by a single set of screws.

FIG. 21 is a section taken along the line 21—21 of FIG. 20.

FIG. 22 is a fragmentary sectional view illustrating a modified construction for piloting the module casings together.

The invention in general

The ready availability, quick assembly and convenient mounting of the different magnetic clutch and brake combinations as contemplated by the present invention is achieved through the provision of preformed and standardized modules or units indicated as A, B, C1, C2, D and E in FIG. 1 and combined to form the different functional and mounting assemblies shown and indicated generally by the numerals 10–16.

Except in the case of the direct motor mounted brake 10, each assembly includes a power input or clutch module C1 or C2 and a power output module A or B, the latter providing a brake for the clutch-brake combinations 11 and 13. The selection of the clutch module C1 or C2 is determined by the manner in which the two module assembly is to be mounted for service use. The C1 module is used in clutch or clutch-brake assemblies 12 and 11 which are to be supported directly on a motor end face of standard NEMA construction and also where the assembly is attached to such a motor but supported by the angular motor mount bracket E as indicated at 15 and 16.

In each of the modules A, B, C1 and C2, the operating parts of the clutch or brake are enclosed within and rotatably mounted on two part hollow casings 17, 18, 19 and 20 (FIG. 1) contoured at their adjacent ends for accurate telescoping of each input-output pair at a joint 21 which is concentric with the axes of the input and output shafts and also accurately positioned axially relative to the rotary pole faces of the magnet carried by the power input module and the armature carried by the power output module. Thus, as an incident to telescoping of the two casings in abutting relation and bolting the same together, the input and output shafts of the two are alined precisely automatically and the friction clutching faces are simultaneously brought into association for proper axial gripping engagement and disengagement under the control of the magnet energization.

While the contemplated modular system of building magnetic clutches is applicable to couplings having rotatable magnets, it is particularly suited to those of the stationary field type in which an annular magnet is fixed in the module casing and coacts with concentric pole pieces on a revolving rotor to form a toroidal flux path which is completed by a relatively flat armature ring mounted on the other module.

NEMA motors

Motors 23 constructed in accordance with well established NEMA standards have a narrow cylindrical male pilot 24 projecting from a generally flat end or shoulder 25 of the motor casing and precisely concentric with the projecting end 26 of the motor shaft which is of standard size and length and equipped with a key 27 of standard dimensions. In most of the type C faces, the pilot diameter 28a is smaller than the bolt circle 28 (FIGS. 3 and 7) around which threaded bolt holes 29 are spaced equidistantly, there being four or eight holes depending on the motor size. In other type C constructions, the pilot may be larger than the bolt circle as shown in FIG. 18. In the type D so-called flange mounting (see FIG. 19), the pilot 24 and the bolt holes 29 are formed in a narrow radial flange 30 as shown in FIG. 19. The dimensions of the parts above described as well as their relative spacing are highly standardized for various sizes of motors.

Clutch module C1

As best shown at the left in FIGS. 3 and 7, this module includes a generally cylindrical ring-like casing 31 having a central bore 33 at one end constituting a female pilot and adapted to telescope closely around the male pilot 24 of a NEMA motor when the casing end 36 is brought into abutment with the end face 25 of the motor as shown in FIGS. 13 and 14. Holes 34 paralleling the casing axis extend through the casing for receiving cap screws 35 by which the casing may be clamped against the motor casing, the heads of the screws then being disposed in countersunk recesses 35a in the inner face 32 of the module casing. The number, size and spacing matches a standard NEMA construction. Beyond the screw heads, the casing 31 is formed around its inner end 32 with an annular male pilot 37 concentric with the module axis and adapted to telescope closely with the inner end of the associated power output module to form the joint 21 above described. For a purpose to appear later, the pilot 37 is of a diameter somewhat different, larger in this instance, than the pilot 24 on the standard NEMA motor.

To provide for bolting the casing end 32 against the inner end of the casing of an output module A or B by standard cap screws 112 as described later, parallel and internally threaded blind end holes 42 are formed and equidistantly spaced around the casing. Each hole is disposed at the same radius as and midway between adjacent ones of the holes 34, thus matching the spacing of the NEMA motor holes 29. As an alternative, and as shown in FIG. 20 a single set of untapped holes 42a may be extended through the full length of the casing 31 to receive longer screws 112b.

Disposed in a countersunk recess 38 in the module casing is the annular core 39 of the clutch magnet 40 which is cemented, brazed or otherwise fixed to the casing. The core is of U-shaped cross-section having concentric pole pieces 41 enclosing a multiple turn winding 43 and terminating about in the plane of the pilot 37. Telescoped with the end portions and around the inner and outer surfaces of the pole pieces 41 are the pole pieces 44 of the magnet rotor 45 separated from the magnet by narrow radial air gaps 46. The annular pieces 44 are rigidly joined together by a ring 47 of high reluctance or non-magnetic material whose end face 48 is flush with the rotor pole faces 49 and cooperates therewith to form one friction face of the clutch. For a purpose to appear later, this face is axially spaced outwardly a substantial distance beyond the end 32 of the module casing.

Integral with the inner end of the inner rotor pole piece is a radial flange 50 which is piloted at 52 (FIG. 3) onto and against the inner end of a sleeve 53 and clamped to the latter by a plurality of cap screws 51. This sleeve forms the hub of the rotor and is sized to telescope closely over the end of the motor shaft 26 and internally splined at 54 to receive a substantial length of the key 27 (see FIG. 13) when the module C1 is bolted to the end of the motor. The position of the hub and magnet along the motor shaft is fixed by tightening a set screw 55.

With the magnet and rotor thus constructed, the desired narrow and uniform width of the two radial gaps 46 is established and maintained automatically as an incident to assembly of the C1 module on a motor of standard NEMA construction. That is to say, the transaxial position of the magnet poles 41 is fixed by the telescoping of the casing 31 onto the motor pilot 24 while the positions of the rotor pole pieces 44 are fixed by the telescoping of the hub 53 onto the motor shaft 26.

In the two module clutch assembly (see FIG. 13), the magnet core and rotor cooperate with a flat armature ring 56 of magnetic material which spans the pole faces 49 and completes a flux circuit 57 of toroidal shape. Thus, the rotor and armature faces are drawn into axial gripping engagement upon energization of the winding 43, the clutch being released when the magnet is deenergized.

Clutch module C2

This module is used for clutches and clutch-brake combinations which are to be mounted seperately on a base module or foot bracket D as shown in FIGS. 15 and 16. Like the C1 module, it comprises a single piece casting defining a generally cylindrical centrally apertured casing 58 whose inner end 59 terminates in a pilot 60 of the same size as the pilot 37 above described. Internally threaded holes 42a are formed in the inner end of the casing the same as the holes 42 in the C1 casing to receive screws 112 by which the casing can be bolted to the casing of an output module.

A magnet 61 having a core of U-shaped cross-section and the same size as the C1 magnet and enclosing a winding 61a is telescoped over the exterior of and suitably fixed to the outer end portion of an axially projecting flange 63 which terminates short of the pilot 60. A rotor 64 having pole pieces 65 telescoped loosely around and within the outer and inner magnet poles and rigidly joined by a nonmagnetic friction ring 66 defines with the pole faces an axially facing friction surface 67 located in the same position relative to the end of the casing as the surface 48, 49, of the C1 module. In the final clutch assembly (FIGS. 15 and 16) the face 67 is adapted for axial gripping engagement with a flat ring armature 62 of the same construction as the armature 56 and completes through the magnet a toroidal flux circuit 62a.

An inturned radial flange 68 integral with the inner pole piece of the rotor 64 is spaced inwardly from the casing end and clamped against the inner end of a shaft 69 by screws 70 whose heads are axially spaced inwardly from the plane of the rotor face 67. The shaft is journaled accurately in the casing through axially spaced anti-friction bearings 71 and 73 pressed onto the shaft, the larger one being around the enlarged inner end of the shaft between a snap ring 74 and a shoulder 75. The other is disposed into the outer end of a central recess 76 in the casing and pressed onto the shaft about midway between the ends of the latter. An outwardly projecting end portion of the shaft carries a key 77 and preferably corresponds in size and length to the standard NEMA shaft 26 above described.

To facilitate mounting of the C2 module on the foot bracket D, an outwardly projecting narrow male pilot 78 is formed around the outer end face 79 of the casing 58. For a reason to appear later, this pilot is of the same diameter and width as the pilot 26 on the NEMA motors, and the casing end around this pilot is formed with NEMA sized and spaced blind end holes 80 threaded to receive clamping screws 81 (FIGS. 15 and 16).

Brake module B

This module is the only one which is intended to be used alone. It may be mounted directly on a NEMA motor end to form the assembly 10 as shown in FIGS. 1 and 11 or combined with either of the clutch modules C1 and C2 for the clutch-brake combinations 11, 13 (FIGS. 1, 13 and 15). As shown in FIGS. 4 and 7, the module includes a ring-like casing 83 having a generally cylindrical outer flange 84 and a shorter inner or hub flange 85. The latter supports two axially spaced anti-friction bearings 86 in which is journaled the intermediate portion of an output shaft 87. Except for the addition of a recess 88 and a pilot 89, this shaft and its bearings are duplicates of the shaft 69 of the clutch module C2 above described. The outwardly projecting end portion 90 is equipped with a key 90ᵃ dimensioned to correspond precisely to the standard NEMA motor shaft 26.

To enable the casing 83 to be bolted to either clutch module C1 or C2 or directly to a NEMA motor end face, parallel holes 111 equidistantly spaced around the casing axis to match the NEMA motor holes 29 are extended through the flange 84 to receive cap screws 112 above referred to. In the tightened condition of these screws, the heads 112ᵃ thereof are disposed in recesses 122 countersunk in the outer end of the casing as best shown in FIGS. 4 and 7. The ends project beyond the end 114 of the casing flange 84 for proper entry in the NEMA motor holes 29 when the casing is mounted directly on the motor (FIG. 11).

Surrounding the inner flange 85 and pressed on or otherwise rigidly secured thereto is a magnet 91 having a core 91ᵃ of U-shaped cross-section with pole pieces spanned by a ring or a series of segments 93 of wear resistant friction material cooperating with the pole piece ends to form a friction face adapted for axial gripping engagement with an armature 95. The latter spans the pole faces 94 and cooperates with the magnet to complete a toroidal path 96 threaded by flux upon energization of a winding 97 secured to and disposed between the pole pieces of the magnet core 91ᵃ.

The armature comprises a generally flat ring of iron having angularly spaced and inwardly projecting radial teeth 98 (see FIG. 8) fitting closely in but slidable along spline grooves 99 angularly spaced around the exterior of a collar 100 which may be composed of molded plastic material. The collar projects axially substantially beyond the brake armature so that the spline grooves thereof may also support the armature 56 or 62 of the C1 and C2 clutch units as will appear later.

Where the brake module B is to be used alone as a motor brake (FIG. 11), the inner end of the shaft 87 is enlarged to provide the inwardly opening recess 88 for direct coupling with the NEMA motor shaft 26. At its outer end, the collar 100 is formed with an inturned radial flange 101 which is counter-bored to telescope over the male pilot 89 on the shaft and is clamped by angularly spaced screws 103 against the end of the shaft. The bore 100ᵃ of the collar is somewhat larger in diameter than the inner end of the hub 53 of the C1 module so that the collar will telescope freely over the latter, the end of the collar projecting past the friction face 48 of the driving clutch rings 45 and 64 in the final assemblies shown in FIGS. 13 to 16.

The clutch armature 56 or 62 and the brake armature 95 are positioned axially along the grooves 99 by devices 105 (FIGS. 8–10) which operate automatically in service use to take up wear at the friction faces of the brake or clutch and maintain a uniform gap 106 of the desired narrow width between these faces when the coupling is disengaged. These devices may take various forms including a preferred construction forming the subject matter of an application Ser. No. 414,336, filed Nov. 27, 1964, by Leroy W. Simonson.

In the form shown herein for purposes of illustration, each device 105 comprises a clip of resilient steel having upstanding flanges 107 and 108 spaced apart at their lower ends a distance greater than the thickness of the armature 95 by the width of the air gap 106 desired to be maintained. Preferably, there is one clip for each of the collar grooves with the teeth 98 of the armature disposed therein as shown in FIG. 9.

Opposite ends 109 of the clip are spaced accurately to be received between the parallel walls of the groove 99 and fit closely therein so as to develop enough friction to maintain the normal axial position of the clip in the groove but capable of being overcome by the magnetic attraction of the armature against the magnet pole faces. Upstanding from the bottom of the clip between the flange parts 108 is a spring arm 110 bent inwardly and bearing at its free end against the friction face of the armature with a force which is less than the friction holding the clip in the spline groove.

When the brake is deenergized, the parts are positioned as shown in FIG. 9, the armature being pressed against the flange 107 by the spring 110. Now, when the armature is attracted to the magnet face, it is shifted away from the flange 107 and against the flange 108 thus bending the spring. If wear has taken place, the armature will engage the flange 108 before it does the magnet poles. As a result, the friction between the clip and the groove walls is overcome, and the armature and clip as a unit are shifted along the grooves. Then, when the magnet is deenergized, the spring pushes the armature away from the magnet and the flanges 108 and against the flange 107 thus establishing the gap 106 of the desired width.

As disclosed more fully in our copending divisional application Ser. No. 544,519, filed Apr. 22, 1966, the projecting end of the outer flange 84 of the brake casing is preferably constructed and located in a special way in order to permit the brake module B alone to be mounted directly on a NEMA motor (FIG. 11). For this purpose, the end of the flange is countersunk to provide a cylindrical internal surface or female pilot 113 adapted to telescope closely with the male pilot 37 and 60 on the C1 and C2 module casings and terminating at an end 114 which, in the telescoped relation of the two casings, abuts against the end 32 or 59 of the clutch casings as shown in FIGS. 13–16. The male and female pilots and the joint 21 are slightly larger than the NEMA motor pilot 24 so that when the brake module is telescoped onto the motor shaft 26 as shown in FIG. 11, the pilot 113 will be spaced radially from the opposed motor pilot 24. In this way, the motor shaft alone locates the output shaft 87 of the brake module so as to avoid any possibility of objectionable loading of the bearings 86.

Also, the end 114 of the casing flange 84 must extend axially beyond the other parts of the module including the exposed end 115 of the armature support collar 100 a distance greater than the axial length of the NEMA pilot 24. This allows the flange end 114 to come into full abutment with the end face 25 of a NEMA motor on which the brake module is mounted directly (see FIG. 11).

Instead of telescoping the casings 31 or 58 with the casing 83 by a single pair of annular surfaces 37 and 113, the desired centering of the abutting casings may be achieved at a plurality of pairs of surfaces. Each such pair may, as shown in FIG. 22, comprise a so-called roll pin 163 pressed into a hole 164 in one of the casings, for example 83, and projecting with a close sliding fit into a hole 165 in the abutting casing 31. The desired piloting and centering action is thus achieved as an incident to relative movement of the two casings axially into endwise abutment.

*Output shaft module A*

Except for omission of the magnet 91 and the armature 96 and reversal of the devices 105 when a clutch armature 56 or 62 is placed on the collar 100, this module (see FIGS. 6, 14 and 16) is identical in construction with the brake module B, the corresponding parts being indicated by the same reference numerals. Thus, the grooves 99 in the collar 100 are long enough to receive the armature, 56 or 62, of the C1 and C2 modules and support the same through the devices 105 near the inner end of the collar for proper association with the clutch modules as an incident to assembling pairs of modules as shown in FIGS. 13–16 as will be described later.

*Attachment of output modules A or B to standard power take-off devices*

The versatility of the present modular system is increased by adaptation of the brake module B and also the output shaft module A for the direct attachment to the housings of standardized speed reducers, gearing, and other power take-off devices which themselves are adapted for direct mounting on the end of a NEMA motor as shown in FIG. 17. This is accomplished by making the outer end face of the casing 83 of standard NEMA construction (see FIGS. 4, 6, 7 and 12). Thus, a male pilot 117 of standard NEMA dimensions projects from an end face or shoulder 118 and is located accurately relative to threaded screw holes 119, the same as the holes 29 of a NEMA motor face. Likewise, the length and size of tthe shaft 90 and its key 90a conform to the same standard.

The casing 83 is thus adapted to fit against and be piloted by the surface 117 and accurately centered relative to the end flange 120 on the housing 121 (FIG. 17) of a standard gear reducer 123 for example. Rigid coupling of the two is effected by screws 124 extending through the flange and threading into the holes 119. Full abutment of the gear housing flange 120 against the end of the casing cup 83 is permitted by providing recesses 122 (FIGS. 6, 7 and 12) in the cup end to receive the heads 112a of the cap screws 112 by which the cup is clamped against the casing ring 31. These recesses are spaced angularly from the holes 119 and are deeper than the cap screw heads.

*Module D for foot mounting*

As shown in FIGS. 1, 15 and 16, this standardized base comprises two flanges 125 upstanding from opposite ends of a flat base plate 126 and spaced apart a distance equal to the spacing of the outer end faces 79 and 118 of the casings 58 and 83 which are assembled to form the clutch 14 (FIGS. 1 and 16) and the clutch-brake 13 (FIGS. 1 and 15) combinations intended for foot mounting separate from a motor. The upper ends 127 of the flanges are curved to fit around the pilot surfaces 78 and 117 on the casing ends and temporarily support the two module assemblies with the bolt circles thereof coinciding with holes 128 angularly spaced around the flange ends to match the holes 80 and 119 of standard NEMA size and spacing in the casings. The flanges may be clamped to casing ends by cap screws 81 and 129 threaded into the casing holes. Four somewhat elongated and parallel slots 130 are formed in the base plate 126 near the corners thereof to receive bolts for fastening the bracket to a desired support for service use of the assembly.

*Module E for motor mounting*

The two module C1, B or C1, A combinations when bolted together as above described may themselves be utilized to support a NEMA motor cantilever fashion as shown at 15 and 16 in FIG. 1. This is accomplished through the use of the module E which comprises one or more flat base plates 133, an integral flange 134 upstanding from one end and triangular webs 135 integrally joining the flange 134 with the plates 133 to form a bracket of rigid truss structure. The webs are spaced to receive the lower portion of the module assembly between them. At its upper edge, the flange is curved as indicated at 136 to fit around the NEMA end pilot 117 on the B and A modules when holes 137 in the flange are in register with the lower two or more of the NEMA screw holes 119 on these modules. Parallel slots 138 near the corners of the plate are adapted to receive bolts for clamping the bracket to a desired support for service use.

*Motor mounted assemblies*

To provide a clutch 12 (FIGS. 1 and 14) or a clutch-brake 11 (FIGS. 1 and 13), mounted directly on and supported solely by a standard NEMA motor, the casing 31 of a C1 module is first telescoped onto the pilot 24 and brought into abutment with the motor end 25, thus centering the magnet 40 accurately relative to the motor shaft 26. The screws 35 are next projected through the holes 34 of the casing and threaded tightly into the corresponding NEMA holes 29 of the motor thus clamping the casing securely to the motor.

With the motor shaft thus projecting axially through and beyond the casing 31, the pole pieces 44 of the rotor 45 are telescoped over and within the pole pieces of the magnet and the hub 53 is fitted onto the projecting end of the motor shaft 26 with the key 27 thereon entering the key way 54 in the hub. The rotor is properly positioned axially by first pressing the rotor axially against the magnet core and then retracting it axially a short distance. The hub 53 is then locked securely in this position by tightening the set screw 55 thus locating the driving friction ring 45 in a definite position along the clutch axis.

Since the rotor 45 is mounted and centered on the hub 53, the motor shaft thus establishes accurately the radial position of the rotor poles 44 while the motor flange pilots the casing 31 and centers the same relative to the motor axis thus locating the magnet pole pieces 41 precisely concentric with the rotor pole pieces 44 to make the gaps 46 of uniform radial width.

If the assembly is to be a clutch-brake 11 (FIGS. 1 and 13), a B module is added and bolted to the casing of the C1 module. First, the clutch armature 56 which is a separate piece and preferably packaged as a part of the clutch module C1, is splined into the grooves 99 of the collar 100 of the B module, the gap maintaining devices 105 being reversed relative to those of the brake armature 95 so that the spring finger 110 urges the armature 56 toward the brake armature. By proper measurement, the armature 56 is positioned along the spline grooves so as to become disposed close to the pole faces 49 of the rotor 45 automatically as an incident to telescoping of the two casings 31 and 83 and abutment of their ends to form the intermediate joint 21. As set forth above, the friction developed between the clutch armature ring 56 and its supporting collar 100 on the output shift is less than the attractive force capable of being developed by the magnet. It will be apparent therefore that if the ring is set out too far along the collar preparatory to the initial assembly of the casing rings, it will come against the face 48 of the driving clutch ring 44 as the casing rings approach each other and be pushed back along the collar to the proper position as the casing rings come into full abutment.

Next, the brake module is alined with the mounted clutch module and shifted toward the latter to telescope the pilot 113 of the outer flange 84 onto the male pilot 37 of the clutch casing 31 and bring the two into abutment as shown in FIG. 13. With the casing 83 thus supported, it is turned around the surface 37 until the holes 42 and 111 are alined to permit standard cap screws 112 to be extended therethrough and the casing rings clamped together by tightening of the screws. Such alinement of the holes and insertion of the clamping screws is facilitated by the use of the screws 112 to secure only the casing rings together, the casing 31 being secured to the motor by the cap screws 35 after a separate and similarly simple operation of alining the two sets of holes 29, 34.

It will be observed that the female pilot surface 33 and the male surface 37 are formed on the single piece ring 31 and therefore may be formed precisely concentric with the axis of the casing and become precisely concentric with the motor shaft as an incident to attachment of the ring to the motor end bell. Similarly, the cup 83 is a single piece on which the female pilot 113 may be formed and the output shaft mounted precisely on a common axis. Thus, as an incident to the attachment of the ring 31 to the motor and the telescoping of the two rings 31 and 83 together at the joint 21, the axes of the motor and output shafts are brought into the desired precise alinement.

If desired and by sacrificing the advantage set forth above, it is possible to employ only one series of NEMA spaced holes in the C1 casing. To this end and as shown in FIG. 20, untapped holes 42a and 111a sized and spaced for coaction with the NEMA motor holes 29 are extended through the outer peripheries of the casings 31 and 83 to receive longer cap screws 112b when the casings 31 and 83 of the C1 and A or B modules are combined for mounting on a motor end face. As before, the end face 118 at the outer ends of the holes 111a in the outer periphery of the output shaft casing 83 is recessed to receive the heads 112a of the screws 112b and thus permit clamping of a NEMA faced gear box or the like directly to the casing as above described.

Other NEMA motor mountings

By simple modifications in construction of their casings, the modules A, B, C1 and C2 as above described are easily adaptable to other NEMA standard motor end contours including the type C construction (see FIG. 18) in which the circle on which the bolt holes 29 are disposed is somewhat smaller in diameter than the pilot 24. For this mounting, holes 140 and 141 are extended through the clutch and brake casings to receive elongated screws 143 adapted, after centering of the casings through the pilots 37, 113, to thread into the NEMA screw holes 29 on the end face of the motor. The pilots 37, 113 are larger in diameter than the bolt circle but adapted to telescope as before to effect proper centering of the two casings relative to each other at the joint 21 which is slightly larger than the NEMA pilot 24 for the reason given above.

In NEMA type D motors (see FIG. 19), the motor bolt holes 29 are in an outwardly projecting flange 30 on the end of which is formed the male pilot surface 24. In the C2 module for such mounting on this flange, holes 145 are extended through the casing 31 to register with the flange holes 29 and the end is countersunk at 146 to fit over the NEMA pilot 24 and allow the end of the casing to come into abutment with the motor flange. An outturned flange 83a on the A and B casings 83 is formed with a female pilot 147 which telescopes with a pilot 148 on the casing 31 to form the joint 21. As before, the joint surfaces are somewhat larger than the NEMA pilot 24 to permit the brake module to be attached directly to the motor when no clutch is required.

The two casings are secured together by screws 149 extending through the registering holes 29 and 145 and threading into holes 150 on the flange 83a of the casing 83. To provide the standard type D contour at the outer end of the casing, an apertured flange 151 and a pilot 153 formed around the casing duplicate the end construction of a NEMA motor, the hole 29a in the flange corresponding to the hole 29 in the motor flange 30.

Foot mounted assemblies

Where the two module assembly, a clutch 14 (FIGS. 1 and 16) or a clutch-brake 13 (FIGS. 1 and 15) is to be mounted for service use through the medium of a base module D, a clutch module C2 is used in combination with an A or B output module. In the C2 module, it will be observed that the proper centering of the rotor pole pieces 64 on the magnet poles is established in the initial manufacture by the journaling of the input shaft 69 in the casing 58 to which the magnet 61 is fixed and mounting the rotor 64 on the inner end of this shaft.

If a clutch-brake assembly 14 (FIGS. 1 and 15) is to be formed, the B module is equipped with two armatures 62 and 95 positioned along the spline grooves 99 of the collar 100 in the manner above described. This module is moved axially toward the open end of the C2 module and the pilot surface 113 on the casing flange 84 is telescoped onto the male pilot 37 of the casing 58 thus centering the two casings accurately. With the flange end 114 in abutment with the shoulder 59 and the holes 42a and 111 in alinement, the screws 112 are inserted through the casing 83 and threaded into the holes 42a thus completing the joint 21 and securing the modules together rigidly.

The assembly thus formed is placed on a base module D between the flanges 125 and the lower portion of the annular pilot surfaces 78 and 117 seated in the curved flange ends 127. After turning the assembly to aline the holes, the screws 81 and 129 are inserted and threaded into the holes 80 and 119 to complete the mounting as shown in FIG. 15.

If the assembly is to be a foot-mounted clutch 14 (FIGS. 1 and 15), the same procedure is followed except that an A module is used for the output end of the assembly.

Motor mounting assemblies

Where a NEMA motor without its own mounting base is to be used and supported solely from a brake, a clutch or a clutch-brake assembly, the mounting bracket E (FIGS. 1m and 1n) is employed as the supporting base. For this purpose, the input shaft module is assembled on and secured to the motor end as described above after which the output module is bolted on and the two module assembly placed between the upstanding flanges 135 of the E bracket with the pilot 117 at the output end of the assembly seated in the curved upper end 136 of the bracket flange 134. Then, after alining the holes 119 on the B or A module with the bracket holes 137, screws 155 (FIG. 1) are inserted and threaded into the holes 119 to clamp the assembly rigidly to the bracket E. Assemblies 15 and 16 (FIG. 1) may thus be formed and adapted for attachment to a suitable support by bolts extended through the holes 138 in the base plate of the bracket E.

Air cooling of module assemblies

Provision may be made for the free circulation of air through the module casings around the parts forming and supporting the friction coupling surfaces. This is accomplished herein by extending through the output end of the casing of the A and B modules angularly spaced passages 156 (FIGS. 4, 6, 11 and 12) which communicate at their inner ends with the annular space 157 between the inner and outer flanges 84 and 85 of the casing. The outer ends of these passages terminate at the inner end of annular recesses 158 which open outwardly and are defined by walls shaped to prevent the entry into the passages of any liquid or foreign matter that may gravitate down onto the casing.

At the inner end of the casing 83, the space 157 merges with an annular space 159, the lower part of which communicates with arcuate openings 160 of substantial size formed in the lower half portion of the casing at the inner end thereof. Rotation of the clutch or brake parts induces a circulation of air through the connected spaces and passages as indicated by the arrows in FIG. 2 being discharged downwardly through the opening 160. In the C2 clutch module, additional cooling is achieved by providing passages 161 extending through the ends of the casing 58.

Advantages

The modular system above described possesses numerous advantages not only to the manufacture of magnetic friction couplings and its sales offices in different localities but especially to the ultimate purchaser and user of individual couplings or small quantities thereof. Thus, the comparatively small number of the modules A–E with the many duplicated parts may be manufactured on a high production basis and therefore at low cost and stocked in various locations in accordance with the anticipated future needs of the manufacturer's sales offices or of manufacturers of NEMA motors, gear reducers, etc. From such conveniently available stocks, the modules required to construct a particular coupling for either a NEMA or standard base mounting may be selected and assembled quickly for installation in a desired machine location. As a result, the purchaser obtains immediate delivery of any one of a variety of couplings with dimensional and mounting tolerances already built in, thus eliminating the cost of providing special mountings as has been necessary heretofore. The saving to the end user is increased because all of the motor mounted modular combinations are adapted for NEMA motors having only one projecting shaft end and therefore obtainable at minimum cost.

In service use, the modular structures above described afford additional operational and servicing advantages. Most important is the use of separate armatures 56, 95 (FIG. 13) and 62, 95 (FIG. 15) in the clutch-brake combinations thus making possible the establishment of gaps of minimum width between each armature and its magnet in the initial assembly. The use of separate brake and clutch armatures also permits the use of automatic wear take-up devices such as the devices 105 above described to maintain air gaps of uniform width and thus compensate automatically for wear thus maintaining uniform capacities of the clutch and brake through their service life.

Disassembly of the casing preparatory to replacing worn out parts is facilitated by making the casing in two parts which, together with the replacement parts, may be reassembled quickly and with the parts in the same precise relation as in the original assembly.

We claim as our invention:

1. A magnetic friction coupling having, in combination, a first casing ring having an outer end adapted for rigid abutment with and attachment to an opposed support, a cylindrical pilot surface formed at the other end of said ring, a second casing ring in the form of a cup having at its open end a second cylindrical pilot surface telescoped closely with said first pilot surface and holding said rings positively in precise axial alinement, two annular series of angularly spaced holes adjacent the outer peripheries of said rings extending parallel to said axis and registering with each other at the joint between the abutting ends of said rings, fastening elements disposed in said registering holes and securing said rings rigidly together in end to end abutment, an output shaft extending along said axis through the bottom of said cup and journaled intermediate its ends in the cup bottom, a rotary input shaft member disposed within said first ring and adapted to be driven by a power rotated shaft, and a magnetic friction clutch housed within the unitary casing defined by said first and second rings and including driving and driven friction rings having opposed axially facing surfaces respectively supported in opposed face to face relation by and rotatable with the adjacent ends of said input member and said output shaft, said driving friction ring comprising concentric and cylindrical inner and outer pole pieces telescoped loosely with annular cylindrical pole pieces of a magnet core fixed to said first casing ring and enclosing an annular winding to form said magnet.

2. A magnetic friction coupling as defined in claim 1 including a support bracket having a flat bottomed base disposed below said casing rings and a flange upstanding from said base and bolted against the outer end of one of said casing rings.

3. A magnetic friction coupling as defined in claim 1 including a power input shaft projecting axially into said first casing ring and rotatable about a fixed axis coincident with the axis of the first ring, the inner end of said input shaft being secured to and supporting said input shaft member with the pole pieces on the latter precisely concentric with the pole pieces of said magnet core.

4. A magnetic friction coupling as defined in claim 1 wherein said rotary input shaft member is carried on a shaft projecting axially through and journalled intermediate its ends in said first casing ring with one end portion of the shaft projecting from said outer ring end and adapted for spline coupling with a power driven member.

5. A magnetic friction device having, in combination, a first casing ring having an outer end adapted for rigid abutment with and attachment to an opposed support, a cylindrical pilot surface formed at the other end of said ring, a second casing ring in the form of a cup having at its open end a second cylindrical pilot surface telescoped closely with said first pilot surface and holding said rings positively in precise axial alinement, two annular series of angularly spaced holes adjacent the outer peripheries of said rings extending parallel to said axis and registering with each other at the joint between the abutting ends of said rings, fastening elements disposed in said registering holes and securing said rings rigidly together in end to end abutment, an output shaft extending along said axis through the bottom of said cup and journaled intermediate its ends in the cup bottom, a rotary input shaft member disposed within said first ring and adapted to be driven by a power rotated shaft, a magnetic friction clutch housed within the unitary casing defined by said first and second rings and including driving and driven friction rings having opposed axially facing surfaces respectively supported in opposed face to face relation by and rotatable with the adjacent ends of said input member and said output shaft, said driving friction ring comprising concentric and cylindrical inner and outer pole pieces telescoped loosely with annular cylindrical pole pieces of a magnet core fixed to said first casing ring and enclosing an annular winding to form said magnet, and a magnetic friction brake disposed within said cup and comprising a second magnet secured to said second ring and encircling the inner end of said output shaft and an armature ring spline coupled to such shaft end between said driven friction ring and the cup bottom and adapted to be drawn by said second magnet when activated into axial gripping engagement with a friction face on the magnet whereby to exert a retarding torque on said output shaft.

6. The combination of, an electric motor having an end bell with a cylindrical male pilot and a circle of parallel bolt holes formed thereon and concentric with a spline drive shaft of predetermined length also incorporated in said motor, a first casing ring having one end abutting said end bell and formed with a pilot telescoped closely with said male pilot and abutting said end bell with said shaft projecting into said first ring along the axis thereof, a second casing ring in the form of a cup abutting said first ring at its open end and having on the latter a second cylindrical pilot surface telescoped closely with said first pilot surface and holding said rings positively in precise axial alinement, two annular series of angularly spaced holes adjacent the outer peripheries of said rings extending parallel to said axis and registering with each other at the joint between the abutting ends of said rings, fastening elements disposed in said first and second holes and securing the telescoped rings rigidly together in end to end abutment and said first ring against said end bell, an output shaft extending along said axis through the bottom of said cup and journaled intermediate its ends in the cup bottom, an internally splined input member disposed within said first ring and telescoped with and spline coupled to said drive shaft ancillary to the abutment of the ring to said end bell, and a magnetic friction clutch housed within the unitary casing defined by said first and second rings and including driving and driven friction rings having opposed axially facing surfaces respectively supported in opposed face to face relation by and rotatable with the adjacent ends of said input member and said output shaft, said driving friction ring comprising concentric and cylindrical inner and outer pole pieces secured to and rigid with the inner end of said drive shaft and located thereby precisely concentric with said axis, and an annular magnet core having cylindrical pole pieces telescoped loosely with the pole pieces of said driving ring, said core being fixed to said first casing ring so that one wall of the radial gap between the core and said driving pole pieces is located precisely by mating of the first casing ring on said male pilot surface and the opposed wall is located by the telescoping of said input member on the drive shaft.

7. A drive transmission for assembly and mounting on an electric motor having at one end a dimensionally standardized cylindrical male pilot and a circle of bolt holes concentric with a standardized projecting shaft, said drive transmission comprising a single piece casing ring for receiving the motor shaft having a female pilot at one end precisely concentric with the ring axis and adapted to mate closely with said male pilot, holes in said ring angularly and radially spaced to register with said motor holes when said pilots are telescoped together, a second casing ring in the form of a cup for abutting at its open end with the other end of said first ring, an output shaft projecting through the bottom of the cup and journaled therein intermediate its ends precisely on the axis of the cup so as to be alined with said motor shaft when said casings are in abutment and said first ring is telescoped on said male pilot, an electromagnetic friction clutch having driving and driven rings housed within said casing ring and cup, the driving ring being in splined engagement with the motor shaft within said first ring, and the driven ring being in driving engagement with the inner end of said output shaft, a magnetic winding mounted within said first casing ring for drawing said driving and driven rings into frictional engagement when energized, third and fourth male and female pilot surfaces on the adjacent ends of said first and second casing rings adapted to telescope closely as an incident to bringing the casing rings into abutment and located precisely relative to the respective axes of their supporting rings whereby precise alinement of said motor and output shafts is achieved by the telescoping of pilots of the motor and said first ring and by the telescoping of said third and fourth pilot surfaces in the abutment of the two casings, and means detachably securing said casing rings and motor in rigid abutment including fastening elements extending into said bolt holes.

8. A drive transmission as defined in claim 7 in which said securing means includes a series of cap screws extending through parallel holes angularly spaced around the periphery of said first casing ring with the heads of the screws disposed in recesses in one of said adjacent ring ends, and a second series of cap screws extending through parallel holes angularly spaced around the periphery of said cup from said first screws with the heads of the second screws abutting the outer end of said second casing ring.

9. A drive transmission as defined in claim 8 in which said securing means includes cap screws extending through parallel holes angularly spaced around the periphery of said second ring with the heads of such screws disposed in recesses in the outer end of such ring with the ends of the screw heads disposed below the end surface of such ring.

10. A drive transmission assembly having, in combination, a casing ring having an outer end adapted for rigid abutment with and bolting detachably to a support, a cylindrical pilot surface formed around the other end of said ring concentric with the ring axis, a second casing ring in the form of a cup, a second cylindrical pilot surface around the cup lip telescoped closely with said first surface and holding the rings positively in precise alinement, means detachably clamping said rings together with said outer end and said cup lip in rigid abutment, a rotary input shaft disposed in a fixed axial position in said first casing ring, a magnetic friction clutch housed within the unitary casing defined by said rings including driving and driven friction rings having opposed faces and a magnet winding mounted within said first casing ring and selectively energizable to control the axial gripping engagement of said friction rings, means mounting said driving friction ring on said shaft in a position axially fixed relative to said first casing ring, an output shaft extending through and journaled intermediate its ends in the bottom of said cup, and means on the inner end of said output shaft supporting said driven friction ring for movement axially along the shaft into gripping engagement with said driving ring while providing a friction resisting movement of the driven ring along the output shaft with a force which is less than the attractive force exerted on the driven ring by said magnet when activated but which is sufficient to maintain the axial position of the driven ring when said magnet is inactive.

11. A drive transmission as defined in claim 10 in which the inner end of said output shaft projects into and past the friction face of said driving ring and said friction resistance is produced by a spring actuated device interposed between the output shaft end and the inner periphery of said driven friction ring.

References Cited

UNITED STATES PATENTS

| | | | |
|---|---|---|---|
| 2,438,223 | 3/1948 | Lear | 192—18.2 |
| 2,520,204 | 8/1950 | Hancock | 192—84 X |
| 2,616,162 | 11/1952 | Sundt | 29—434 |
| 2,962,145 | 11/1960 | Diebold | 192—84 |
| 3,042,164 | 7/1962 | Maurice et al. | 192—84 |
| 3,054,490 | 9/1962 | Harting | 192—84 |
| 3,186,081 | 6/1965 | Barisch | 29—434 |
| 3,240,302 | 3/1966 | Van Tuyl | 192—18.2 |
| 3,246,725 | 4/1966 | Brashear | 192—18.2 |
| 3,254,746 | 6/1966 | Myers | 192—84 |

DAVID J. WILLIAMOWSKY, *Primary Examiner.*

A. T. McKEON, *Assistant Examiner.*